US010566832B2

(12) United States Patent
Mack

(10) Patent No.: US 10,566,832 B2
(45) Date of Patent: Feb. 18, 2020

(54) DEVICE FOR OPERATING A CHARGING UNIT, CHARGING SYSTEM

(71) Applicant: Robert Bosch GmbH, Stuttgart (DE)

(72) Inventor: Juergen Mack, Goeppingen (DE)

(73) Assignee: Robert Bosch GmbH, Stuttgart (DE)

( * ) Notice: Subject to any disclaimer, the term of this patent is extended or adjusted under 35 U.S.C. 154(b) by 502 days.

(21) Appl. No.: 14/924,226

(22) Filed: Oct. 27, 2015

(65) Prior Publication Data

US 2016/0126759 A1 May 5, 2016

(30) Foreign Application Priority Data

Oct. 31, 2014 (DE) .................... 10 2014 222 254

(51) Int. Cl.
*H02J 7/00* (2006.01)
*H02J 7/14* (2006.01)

(52) U.S. Cl.
CPC .......... *H02J 7/1461* (2013.01); *H02J 7/0031* (2013.01); *H02J 2007/004* (2013.01)

(58) Field of Classification Search
CPC .................................................. H02J 7/1461
USPC ....................................................... 320/107
See application file for complete search history.

(56) References Cited

U.S. PATENT DOCUMENTS

| 3,928,791 A | * | 12/1975 | Mullersman | .......... | H02J 7/0026 |
| | | | | | 320/119 |
| 6,326,767 B1 | * | 12/2001 | Small | ................. | H01M 2/1055 |
| | | | | | 320/116 |
| 6,462,507 B2 | * | 10/2002 | Fisher, Jr. | ............ | H02J 7/0068 |
| | | | | | 307/66 |
| 6,756,697 B2 | | 6/2004 | Mizutani et al. | | |
| 8,558,712 B2 | * | 10/2013 | Fechalos | ............. | H01M 10/482 |
| | | | | | 320/116 |
| 2003/0085621 A1 | * | 5/2003 | Potega | .................. | B60L 11/185 |
| | | | | | 307/18 |
| 2011/0167290 A1 | * | 7/2011 | Yoshimoto | ................ | G06F 1/26 |
| | | | | | 713/340 |
| 2015/0251559 A1 | * | 9/2015 | Chauvelier | ......... | B60L 11/1868 |
| | | | | | 307/9.1 |
| 2016/0006272 A1 | * | 1/2016 | Greening | .............. | H02J 7/0008 |
| | | | | | 320/162 |

FOREIGN PATENT DOCUMENTS

| CN | 101816092 A | 8/2010 |
| CN | 201742123 U | 2/2011 |
| CN | 103863129 A | 6/2014 |

* cited by examiner

*Primary Examiner* — Jerry D Robbins
(74) *Attorney, Agent, or Firm* — Norton Rose Fulbright US LLP; Gerard Messina

(57) ABSTRACT

A device for operating a charging unit that is connected/is connectable to a supply network and to a rechargeable energy store. A control unit and at least one sensor connected to the control unit are provided, the control unit being connected to a control input of the charging unit to switch on the charging unit as a function of a measured value of the at least one sensor for charging the energy store, or to switch it off for interrupting an electrical connection between the supply network and the energy store.

19 Claims, 1 Drawing Sheet

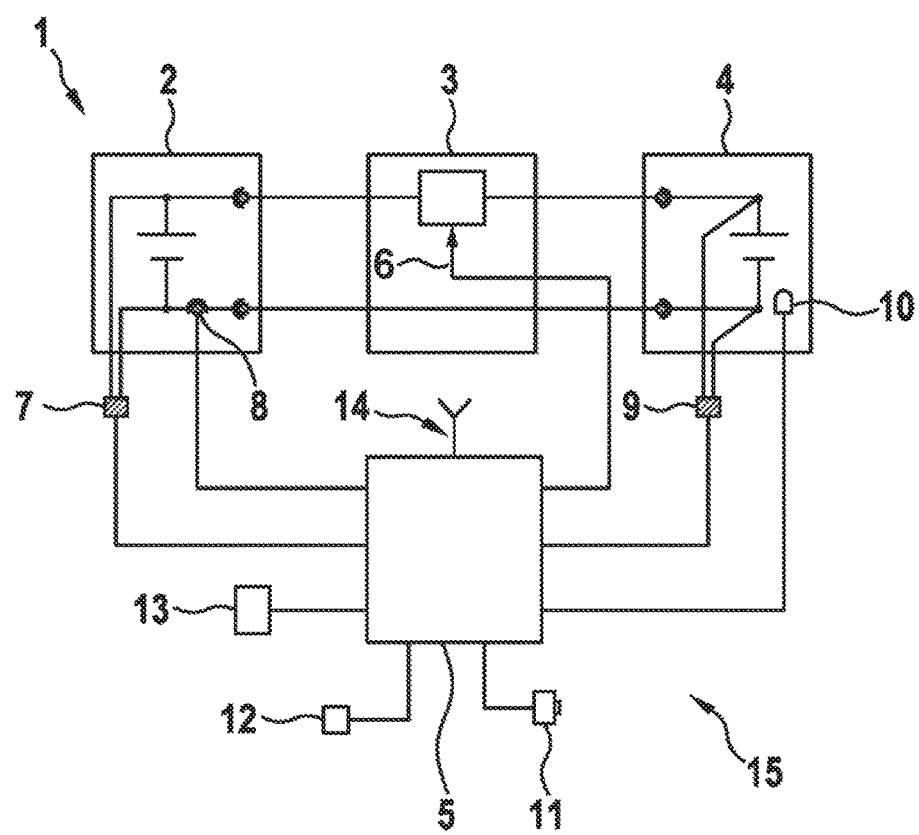

DEVICE FOR OPERATING A CHARGING UNIT, CHARGING SYSTEM

RELATED APPLICATION INFORMATION

The present application claims priority to and the benefit of German patent application no. 10 2014 222 254.0, which was filed in Germany on Oct. 31, 2014, the disclosure of which is incorporated herein by reference.

FIELD OF THE INVENTION

The present invention relates to a device for operating a charging unit, which on the one hand is connected/is connectable to a supply network and on the other hand to an energy store, the charging unit being able to be switched on and off. Furthermore, the present invention relates to a charging system for electrically charging a rechargeable energy store, including a supply network, a charging unit connected to the supply network and a device for operating the charging unit.

BACKGROUND INFORMATION

Devices and charging systems of the above-named type are known from the related art. In the case of charging units which are connected to supply networks having limited resources, it is not always practical or possible to withdraw energy from the supply network. This is in particular the case when a further withdrawal of energy from the supply network would result in a complete exhaustion of the supply network. Such supply networks may be found, for example, in motor vehicles. Motor vehicles have a vehicle electrical system, which is used, for example, as a supply network for auxiliary units or other electrical equipment. The vehicle electrical system itself is also supplied with energy from a battery or a rechargeable energy store, so that the energy available to it is basically finite, unless the battery is recharged. If the load on the supply network is too high and the energy source is exhausted, further operation of the motor vehicle is no longer possible.

A charging unit connected to the supply network is then also no longer supplied with energy and a charging operation cannot take place. In this state, it is consequently also not possible to inform a user of this state. For the user, the state of the charging unit is thus not directly apparent. If it is apparent to the user that the charging operation is not taking place, the user might also assume from this that a defect is present, which may result in unnecessary irritation of the user.

SUMMARY OF THE INVENTION

The device according to the present invention having the features described herein has the advantage that the charging unit is operated as a function of external factors. According to the present invention, a control unit and at least one sensor connected to the control unit are provided for this purpose, the control unit being connected to a control input of the charging unit in order to switch on the charging unit for charging the energy store or to switch off the charging unit for interrupting the electrical connection, at least as a function of a measured value of the sensor for establishing an electrical connection between the supply network and the energy store. The sensor is in particular provided for detecting a state of exhaustion of the supply network, so that the control unit is able to switch off the charging unit and signal the switching off to a user, in particular when the sensor detects that a state of exhaustion or a critical state of the supply network has been reached. When in the switched off state, the charging unit may be in an expanded standby operation, in which, except for the charging operation, it is able to carry out other functions, for example, diagnostic functions or the like. Switching the charging unit on thus causes it to establish an electrical connection between the supply network and the energy store for carrying out a charging operation, and this connection is interrupted by a switch-off. The charging unit is thus configured in such a way that it establishes or interrupts the electrical connection as a function of the control command of the control unit.

According to a refinement of the present invention, it is provided that the sensor is assigned/is assignable to the supply network. This makes it possible for the sensor to determine the state, in particular a residual capacity of the supply network, or ascertain a measured value, which is evaluated by the control unit in order to detect the state of exhaustion or the residual capacity of the supply network.

It may be provided that the sensor is configured as a voltage sensor for detecting a supply voltage of the supply network. As a function of the supply voltage, it is possible in a simple manner to infer the state of exhaustion or the residual capacity or the operating condition of the supply network.

Alternatively or in addition, it may be provided that the at least one sensor or at least one additional sensor is configured as a temperature sensor. Also the temperature may be used as a criterion for determining the operating condition of the supply network. Thus, the temperature sensor may be used, for example, for detecting an ambient temperature, in order to optimize the operation of the supply network as a function of the ambient temperature. Alternatively, it may be provided that the temperature sensor is assigned to the rechargeable energy store, so that an overstraining of the energy store by, for example, the charging unit, is avoided with the aid of the control unit. Moreover, it is conceivable that the temperature sensor is assigned to the supply network in order to detect an operating temperature of the supply network, so that the control unit switches off the charging unit as a function of the detected operating temperature, in particular if a limiting temperature is exceeded by the operating temperature, in order to avoid overstraining of the supply network.

According to a refinement of the present invention, it is provided that the control unit is connected to a timer. This makes it possible for the operation of the charging unit to also be carried out in a time-controlled manner.

Furthermore, it may be provided that the control unit is connected to an actuator switch. Using the actuator switch, a user may start a charging operation manually or switch the charging unit into operation, the charging unit advantageously being switched on or off as a function of the measured value of the at least one sensor. By activating the actuator switch, the user may thus only indicate his/her request to carry out a charging operation. Whether the charging operation is actually carried out depends in particular on the state of the supply network.

According to one advantageous refinement of the present invention, it is provided that the control unit is configured as a separate control device. The separate control device may be integrated simply into different charging systems and need only be connected to the charging unit or to a control input of the charging unit. The control device may be connected to or supplemented by additional sensors and/or switches in a simple manner.

According to one alternative specific embodiment of the present invention, it may be provided that the control unit is configured for being integrated into the charging unit. This results in a particularly compact configuration of the charging unit.

The charging system according to the present invention having the features described herein is characterized by the device according to the present invention. This results in the advantages already named above. In particular, it is provided that the control unit is configured as a separate control device or for being integrated into the charging unit. Furthermore, it is in particular provided that the sensor is assigned to the supply network, in particular as a voltage sensor.

According to one advantageous refinement of the charging system according to the present invention, it is provided that the charging unit and/or the control unit include(s) at least one signaling device for signaling an operating state of the charging unit. As a function of the operating state of the charging unit predefined by the control unit, a message is output to, for example, the user, in particular the driver of a motor vehicle having the charging system, and in particular the operating state of the charging unit is signaled to him/her, so that the user is not able to make any misjudgments of a situation. In particular, this ensures that in the case of a non-completed charging operation, the user is informed that the charging operation is intentionally not carried out because, for example, the supply network is nearly exhausted. This may avoid irritations of the user in the case of a non-completed charging operation.

The present invention will be elucidated in greater detail in the following with reference to the drawing.

BRIEF DESCRIPTION OF THE DRAWING

The FIGURE shows a charging system in a simplified representation.

DETAILED DESCRIPTION

In a simplified representation, the sole FIGURE shows a charging system 1 of, for example, a motor vehicle or a photovoltaic system. Charging system 1 includes a supply network 2, which is, for example, the vehicle electrical system of the motor vehicle. Supply network 2 is connected to a rechargeable energy store 4 via a charging unit 3. Charging unit 3 is configured in such a way that it establishes an electrical connection between supply network 2 and the energy store in a switched-on switching state, in particular for charging energy store 4, and interrupts this electrical connection in a switched-off switching state. In the switched-off switching state, charging unit 3 may, however, still able to carry out diagnostic functions, analyses or the like. Furthermore, charging system 1 includes a control unit 5, which is connected to a control input 6 of charging unit 3, in order to switch charging unit 3 on and off.

Control unit 5 is furthermore connected to a voltage sensor 7, which is assigned to supply network 2, in order to detect its operating voltage or residual capacity. Moreover, control unit 5 is connected to a current sensor 8, which monitors an operating current of supply network 2. Furthermore, control unit 5 is connected to a voltage sensor 9 for detecting an operating voltage of energy store 4, as well as to a temperature sensor 10 for detecting an operating temperature of energy store 4.

Control unit 5 is furthermore connected to an actuator switch 11, with the aid of which a user may, by activating it, inform charging system 1 of his/her request for charging energy store 4. Control unit 5 is furthermore connected to an additional temperature sensor 12, which is configured and/or positioned for detecting the ambient temperature. Furthermore, control unit 5 is connected to a timer 13, which is deigned, for example, as a counter and specifies, for example, a maximum duty cycle of charging unit 3.

Advantageous charging system 1 makes a smooth operation of supply network 2 possible; in particular, the advantageous configuration ensures that supply network 2 is not exhausted or overstrained by charging unit 3. If, with the aid of voltage sensor 7, control unit 5 detects that the remaining residual capacity in supply network 2 falls below a critical limiting value, which indicates that the energy in supply network 2 is nearly exhausted, control unit 5 outputs a control signal to control input 6 of charging unit 3 in order to switch off charging unit 3. This protects supply network 2 against further discharge. If the operating voltage of supply network 2 has again normalized or increased, control unit 5 sends an appropriate switch-on command to charging unit 3 or to its control input 6, in particular when a charge request was indicated by activating actuator switch 11. Charging unit 3 is configured in such a way that it is switched on in a first operating state for the transfer of energy from supply network 2 to energy store 4, and in a second operating state, it completely interrupts a transfer of energy between supply network 2 and energy store 4. Using the switch-on command or the switch-off command, control unit 5 switches charging unit 3 into the first or second operating state.

If, with the aid of one of the other sensors 9, 10 or 12, control unit 5 detects that a critical situation is present, such as, for example, overheating of energy store 4, control unit 5 appropriately controls charging unit 3 in such a way that it is switched off to protect energy store 4.

As a function of the ambient temperature detected with the aid of sensor 12, it is in particular provided that control unit 5 activates charging unit 3 to avoid an overstraining of supply network 2 and/or energy store 4, for example, in the case of high ambient temperatures.

In contrast to the exemplary embodiment shown, additional specific embodiments are also conceivable, in which control unit 5 is connected to fewer or more sensors. While in the present exemplary embodiment, control unit 5 is configured as a separate control device, it is alternatively also conceivable to configure control unit 5 for being integrated into charging unit 3, as a result of which, for example, a more direct connection of control unit 5 to charging unit 3 is ensured. As a result, charging system 1 has an overall compact configuration.

Furthermore, charging system 1 advantageously has a signaling device 14, which in the present case is assigned to control unit 5 or the control device. In the present exemplary embodiment, signaling device 14 is configured as a radio device, which directs via radio the operating status of charging unit 3 to, for example, an on-board computer of motor vehicle 1 having charging system 1, to inform a user of the motor vehicle concerning the charge state or the operating state of charging unit 3. In particular, the user is informed in this way whether charging unit 3 is switched on or is switched off. This prevents the user from being irritated by a requested but not completed charging operation, if charging unit 3 was switched off by control unit 5, for example, due to an excessively low supply voltage of supply network 2.

Control unit 5, with the aid of signaling device 14, may also signal a readiness for charging of energy store 4, the instantaneous charge state of energy store 4, which is detectable with the aid of voltage sensor 9, the instantaneous operating temperature of energy store 4, which is ascertained with the aid of sensor 10, and/or yet additional states of charging system 1 which are of interest to the user. As an alternative to a wireless connection resulting from the configuration as a radio device, it is also conceivable to configure signaling device 14 as a wired signaling device. It is also conceivable to provide signaling device 14 itself with an indicator, so that in particular the operating state is indicated directly to a control unit 5 or a charging unit 3. Together with sensors 7, 8, 9, 10, 12, actuator switch 11, timer 13 and signaling device 14, control unit 5 forms a device 15 for operating charging unit 3. It is not necessary for device 15 to have all of the mentioned sensors, actuator switch and timer. In particular, it may be provided that control unit 5 is connected to only one sensor, for example, sensor 7. It is important that at least one sensor is connected to control unit 5, the measuring signal of which provides information concerning an exhaustion or possible exhaustion of supply network 2. In particular, sensors 9 and/or 10 assigned to energy store 4, as well as sensor 12 assigned to the surroundings, as well as timer 13 and actuator switch 11 represent advantageous options of device 15.

What is claimed is:

1. A device for operating a charging unit, comprising:
    a control unit; and
    at least one sensor connected to the control unit to measure at least one of: a supply voltage of a supply network, or a supply current of the supply network, wherein the supply network is a vehicle electrical system within a motor vehicle, and wherein the vehicle electrical system is supplied with energy by a vehicle rechargeable energy store of the motor vehicle, and wherein the vehicle rechargeable energy store is situated within the motor vehicle;
    wherein the control unit is connectable to a control input of the charging unit, the charging unit being connectable to the supply network and to a rechargeable energy store to charge the energy store via the at least one of the supply voltage of the supply network or the supply current of the supply network, the control unit configured to: (i) switch on the charging unit to charge the energy store via the at least one of the supply voltage of the supply network or the supply current of the supply network, and (ii) switch off, as a function of at least one measured value of the at least one sensor indicating an energy level of the supply network has fallen below a predetermined energy level, the charging unit to interrupt an electrical connection between the supply network and the energy store so that the at least one of the supply voltage of the supply network or the supply current of the supply network can no longer charge the energy store to protect the vehicle rechargeable energy store of the motor vehicle; and
    wherein the vehicle rechargeable energy store is separate from the energy store.

2. The device of claim 1, wherein the at least one sensor is assignable to the supply network.

3. The device of claim 1, wherein the at least one sensor includes a voltage sensor for detecting the supply voltage of the supply network.

4. The device of claim 1, wherein the at least one sensor includes a temperature sensor.

5. The device of claim 1, wherein the control unit is connected to a timer.

6. The device of claim 1, wherein the control unit is connected to an actuator switch.

7. The device of claim 1, wherein the control unit is a separate control device.

8. The device of claim 1, wherein the control unit is integrate-able into the charging unit.

9. The device of claim 1, wherein the control unit includes at least one signaling device for signaling whether the charging unit is switched on or switched off.

10. The device of claim 1, wherein the at least one sensor includes a current sensor for detecting the supply current of the supply network.

11. The device as recited in claim 1, wherein the control unit includes at least one signaling device for signaling whether the charging unit is switched on or switched off, and wherein the signaling device is a wireless radio device, and the signaling is transmitted via radio to an on-board computer of the vehicle.

12. The device as recited in claim 1, wherein the switch off, as the function of the at least one measured value, protects the rechargeable energy store of the vehicle from being exhausted.

13. A charging system for electrically charging an energy store, comprising:
    a supply network, wherein the supply network is a vehicle electrical system within a motor vehicle, and wherein the vehicle electrical system is supplied with energy by a vehicle rechargeable energy store of the motor vehicle, and wherein the vehicle rechargeable energy store is situated within the motor vehicle;
    a charging unit connected to the supply network; and a device for operating a charging unit, including: a control unit; and
    at least one sensor connected to the control unit to measure at least one of: a supply voltage of the supply network, or a supply current of the supply network;
    wherein the control unit is connectable to a control input of the charging unit, the charging unit being connectable to the supply network and to a rechargeable energy store to charge the energy store via the at least one of the supply voltage of the supply network or the supply current of the supply network, the control unit configured to: (i) switch on the charging unit to charge the energy store via the at least one of the supply voltage of the supply network or the supply current of the supply network, and (ii) switch off, as a function of at least one measured value of the at least one sensor indicating an energy level of the supply network has fallen below a predetermined energy level, the charging unit for interrupting to interrupt an electrical connection between the supply network and the energy store so that the at least one of the supply voltage of the supply network or the supply current of the supply network can no longer charge the energy store to protect the vehicle rechargeable energy store of the motor vehicle; and
    wherein the vehicle rechargeable energy store is separate from the energy store.

14. The charging system of claim 13, wherein at least one of the charging unit and the control unit includes at least one signaling device for signaling an operating state of the charging unit.

15. The charging system of claim 13, wherein at least one of the charging unit and the control unit includes at least one signaling device for signaling whether the charging unit is switched on or switched off.

16. The charging system of claim 13, wherein the at least one sensor includes a voltage sensor for detecting the supply voltage of the supply network.

17. The charging system of claim 13, wherein the at least one sensor includes a current sensor for detecting the supply current of the supply network.

18. The charging system as recited in claim 13, wherein at least one of the charging unit and the control unit includes at least one signaling device for signaling whether the charging unit is switched on or switched off, and wherein the signaling device is a wireless radio device, and the signaling is transmitted via radio to an on-board computer of the vehicle.

19. The charging system as recited in claim 13, wherein the switch off, as the function of the at least one measured value, protects the rechargeable energy store of the vehicle from being exhausted.

\* \* \* \* \*